(12) United States Patent
Noumura (10) Patent No.: US 10,315,653 B2
(45) Date of Patent: Jun. 11, 2019

(54) VEHICLE RUNNING CONTROL APPARATUS

(71) Applicant: TOYOTA JIDOSHA KABUSHIKI KAISHA, Toyota-shi, Aichi-ken (JP)

(72) Inventor: Shin Noumura, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 92 days.

(21) Appl. No.: 15/281,197

(22) Filed: Sep. 30, 2016

(65) Prior Publication Data

US 2017/0129488 A1    May 11, 2017

(30) Foreign Application Priority Data

Nov. 11, 2015    (JP) .................................. 2015-221536

(51) Int. Cl.
*B60W 30/16* (2012.01)
*B60W 40/107* (2012.01)
(Continued)

(52) U.S. Cl.
CPC ............ *B60W 30/16* (2013.01); *B60W 10/04* (2013.01); *B60W 10/18* (2013.01);
(Continued)

(58) Field of Classification Search
CPC ................ B60W 30/16; B60W 10/04; B60W 30/18136; B60W 30/18072; B60W 10/18; B60W 2550/308; B60W 2720/106; B60W 2550/302; B60W 2540/12; B60W 2540/10; B60W 2520/10
See application file for complete search history.

(56) References Cited

U.S. PATENT DOCUMENTS

2014/0288799 A1*  9/2014  Elwart .................. B60W 40/09
701/96

FOREIGN PATENT DOCUMENTS

JP    2005-22647 A    1/2005
JP    2007-137148 A    6/2007
(Continued)

OTHER PUBLICATIONS

Machine Translation of JP2007/137148, printed Mar. 27, 2018 (Year: 2007).*

(Continued)

*Primary Examiner* — Alan D Hutchinson
(74) *Attorney, Agent, or Firm* — Sughrue Mion, PLLC (57) ABSTRACT

A vehicle running control apparatus is provided with: a first detector configured to detect an inter-vehicle distance, and a speed of a self-vehicle or a relative speed; a second detector configured to detect accelerator-off and brake-off; a first calculator configured to calculate an approaching degree; a second calculator configured to calculate target deceleration corresponding to an engine brake amount on the basis of the approaching degree if the accelerator-off and the brake-off are detected; a controller configured to change the engine brake amount in accordance with the target deceleration; and a regulator configured to regulate or restrict a number of changes from an increase side to a reduction side of the engine brake amount, and a number of changes from the reduction side to the increase side, to be less than or equal to a predetermined number of times.

4 Claims, 9 Drawing Sheets

(51) Int. Cl.
    *F02D 29/02*    (2006.01)
    *B60W 10/04*    (2006.01)
    *B60W 10/18*    (2012.01)
    *B60W 30/18*    (2012.01)

(52) U.S. Cl.
    CPC ............... *B60W 30/18072* (2013.01); *B60W 30/18136* (2013.01); *B60W 2520/10* (2013.01); *B60W 2540/10* (2013.01); *B60W 2540/12* (2013.01); *B60W 2550/302* (2013.01); *B60W 2550/308* (2013.01); *B60W 2720/106* (2013.01)

(56) References Cited

FOREIGN PATENT DOCUMENTS

| | | | |
|---|---|---|---|
| JP | 2007137148 A | * | 6/2007 |
| JP | 2009-173093 A | | 8/2009 |
| JP | 2011-98604 A | | 5/2011 |
| JP | 2011-116177 A | | 6/2011 |
| JP | 2011116177 A | * | 6/2011 |

OTHER PUBLICATIONS

Machine Translation of JP 2011/116177, printed Mar. 27, 2018 (Year: 2011).*

* cited by examiner

VEHICLE RUNNING CONTROL APPARATUS

CROSS-REFERENCE TO RELATED APPLICATIONS

This application is based upon and claims the benefit of priority of the prior Japanese Patent Application No. 2015-221536, filed on Nov. 11, 2015, the entire contents of which are incorporated herein by reference.

BACKGROUND OF THE INVENTION

1. Field of the Invention

Embodiments of the present invention relate to a vehicle running control apparatus configured to perform control regarding vehicle running in a vehicle, such as, for example, an automobile.

2. Description of the Related Art

For this type of apparatus, there is known an apparatus configured to automatically accelerate and decelerate a vehicle. Japanese Patent Application Laid Open No. 2009-173093 discloses that a process for gently decelerating a vehicle is performed if control is performed to stop the vehicle on a stop line, on an apparatus configured to assist a driver by determining, from lighting information regarding a traffic light, whether or not to pass through an intersection.

If the vehicle is automatically decelerated, a method of adjusting the deceleration of a self-vehicle with reference to a preceding vehicle can be used. Specifically, by changing the deceleration of the self-vehicle in accordance with an inter-vehicle distance and a relative speed to the preceding vehicle, it is possible to perform the deceleration while avoiding that the self-vehicle and the preceding vehicle excessively approach to or excessively separate from each other.

In the method based on the preceding vehicle described above, however, if the inter-vehicle distance or the relative speed to the preceding vehicle changes, the deceleration of the self-vehicle also changes at each time of the change. This possibly causes hunting in the deceleration of the self-vehicle depending on circumstances and may give the driver discomfort caused by unstable deceleration, which is technically problematic.

SUMMARY

In view of the aforementioned problems, it is therefore an object of embodiments of the present invention to provide a vehicle running control apparatus configured to suppress the hunting in the deceleration when the vehicle is decelerated.

The above object of embodiments of the present invention can be achieved by a vehicle running control apparatus configured to control acceleration and deceleration of a self-vehicle in accordance with an approaching degree between the self-vehicle and a preceding vehicle, said vehicle running control apparatus comprising: a first detector configured to detect (i) an inter-vehicle distance between the self-vehicle and the preceding vehicle and (ii) a speed of the self-vehicle, or a relative speed between the self-vehicle and the preceding vehicle; a second detector configured to detect accelerator-off and brake-off in the self-vehicle; a first calculator configured to calculate the approaching degree on the basis of the inter-vehicle distance and on the basis of the speed of the self-vehicle or the relative speed; a second calculator configured to calculate target deceleration corresponding to an engine brake amount on the basis of the approaching degree calculated on the first calculator, if the accelerator-off and the brake-off are detected; a controller configured to change the engine brake amount in accordance with the target deceleration; and a regulator configured to regulate or restrict a number of changes from an increase side to a reduction side of the engine brake amount by said controller, and a number of changes from the reduction side to the increase side, to be less than or equal to a predetermined number of times, after the accelerator-off and the brake-off are detected.

Particularly, here, in the vehicle running control apparatus according to embodiments of the present invention, the number of changes from the increase side to the reduction side of the engine brake amount and the number of changes from the reduction side to the increase side are regulated or restricted to be less than or equal to the predetermined number of times, after the accelerator-off and the brake-off are detected. In other words, the increase and reduction in the engine brake amount are regulated or restricted to be less than or equal to the predetermined number of times. As a result, according to the vehicle running control apparatus in embodiments of the present invention, it is possible to suppress the hunting in the deceleration, which is caused if the automatic deceleration control is performed by the engine brake. It is therefore possible to reduce the driver's discomfort, which is caused by a frequent change in the deceleration of the vehicle.

<2>

In one aspect of the vehicle running control apparatus according to embodiments of the present invention, wherein the predetermined number of times is individually set as a first predetermined number of times corresponding to the changes from the increase side to the reduction side of the engine brake amount by said controller, and as a second predetermined number of times corresponding to the changes from the reduction side to the increase side.

According to this embodiment, the changes from the increase side to the reduction side of the engine brake amount and the changes from the reduction side to the increase side can be regulated or restricted respectively by the different numbers of times. It is thus possible to finely regulate or restrict the increase and reduction in the deceleration, and to more effectively reduce the driver's discomfort.

<3>

In another aspect of the vehicle running control apparatus according to embodiments of the present invention, wherein said first calculator is configured to calculate the approaching degree, when the accelerator-off or the brake-off is detected.

According to this embodiment, the deceleration can be controlled (i.e. the engine brake amount can be controlled) in accordance with the approaching degree, immediately after the accelerator-off or the brake-off is detected. Thus, the deceleration can be started in more appropriate timing. On the other hand, if the fine increase and reduction in the deceleration are repeated immediately after the accelerator-off or the brake-off, the discomfort given to the driver is also considered to be increased. It is thus possible to increase an effect achieved by suppressing the hunting in the deceleration.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

A vehicle running control apparatus according to embodiments of the present invention will be explained with reference to the drawings.
(Configuration of Vehicle)

Figure 1:
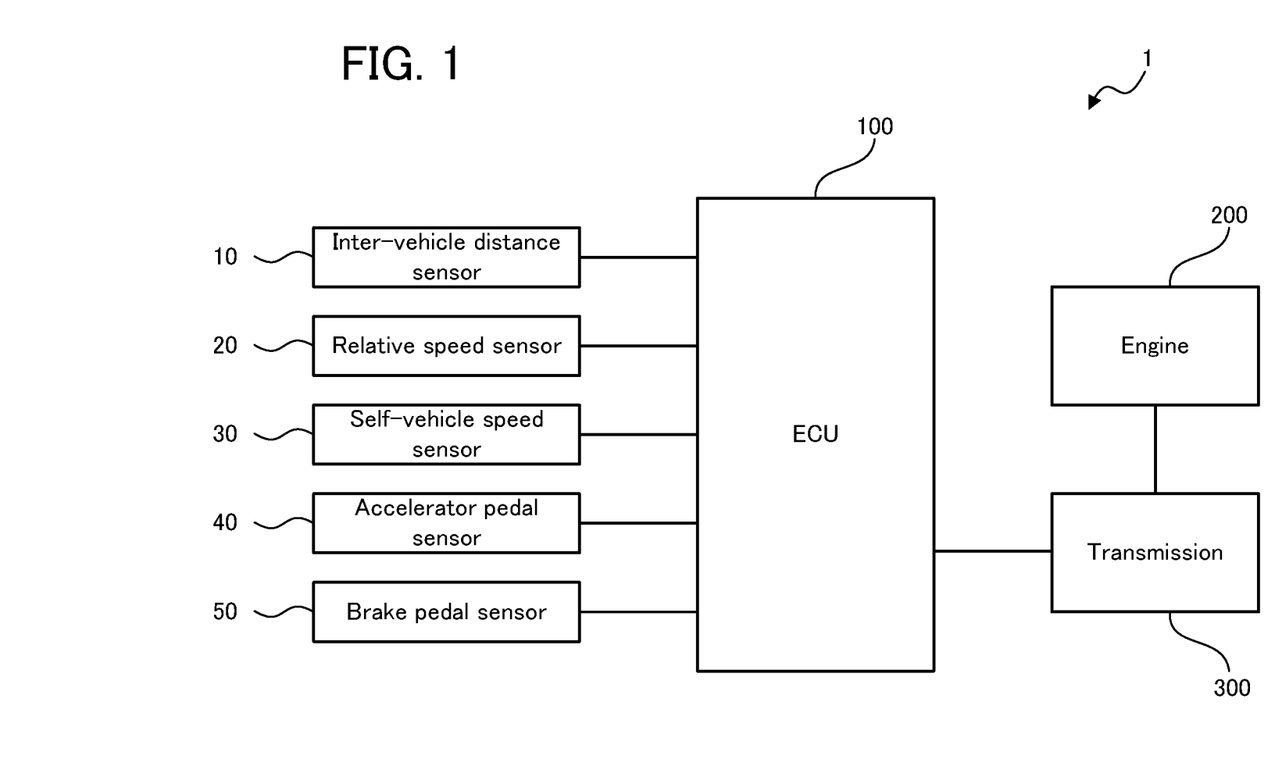
FIG. 1 is a block diagram schematically illustrating a configuration of a vehicle according to an embodiment.

Firstly, a configuration of a vehicle on which a vehicle running control apparatus according to an embodiment is mounted will be explained with reference to FIG. 1. FIG. 1 is a block diagram schematically illustrating the configuration of the vehicle according to the embodiment.

In FIG. 1, a vehicle 1 according to the embodiment is provided with an inter-vehicle distance sensor 10, a relative speed sensor 20, a self-vehicle speed sensor 30, an accelerator pedal sensor 40, a brake pedal sensor 50, an electronic control unit (ECU) 100, an engine 200, and a transmission 300. Hereinafter, the vehicle 1 will be sometimes referred to as a "self-vehicle 1" in order to distinguish it from another vehicle (e.g. a preceding vehicle, etc.).

The inter-vehicle distance sensor 10 is configured, for example, as a millimeter wave radar, and is configured to detect an inter-vehicle distance between the self-vehicle 1 and a preceding vehicle and to output it to the ECU 100. The "preceding vehicle" herein means a vehicle that is to be a reference for deceleration control based on an engine brake described later, and does not necessarily mean a vehicle that runs on the same line immediately before the self-vehicle. The relative speed sensor 20 is configured, for example, as a millimeter wave radar, and is configured to detect a relative speed between the self-vehicle 1 and a preceding vehicle and to output it to the ECU 100. The self-vehicle speed sensor 30 is configured, for example, as a sensor that can detect a speed (or a self-vehicle speed) of the self-vehicle 1 on the basis of the number of revolutions of a drive shaft, and is configured to output the detected self-vehicle speed to the ECU 100. The inter-vehicle distance sensor 10, the relative speed sensor 20, and the self-vehicle speed sensor 30 are one specific example of the "first detector".

The accelerator pedal sensor 40 is configured to detect an opening degree of an accelerator pedal (in other words, a step amount of the accelerator pedal stepped by a driver) and to output it to the ECU 100. The brake pedal sensor 50 is configured to detect an opening degree of a brake pedal (in other words, a step amount of the brake pedal stepped by the driver) and to output it to the ECU 100. The accelerator pedal sensor 40 and the brake pedal sensor 50 are one specific example of the "second detector".

Figure 2:
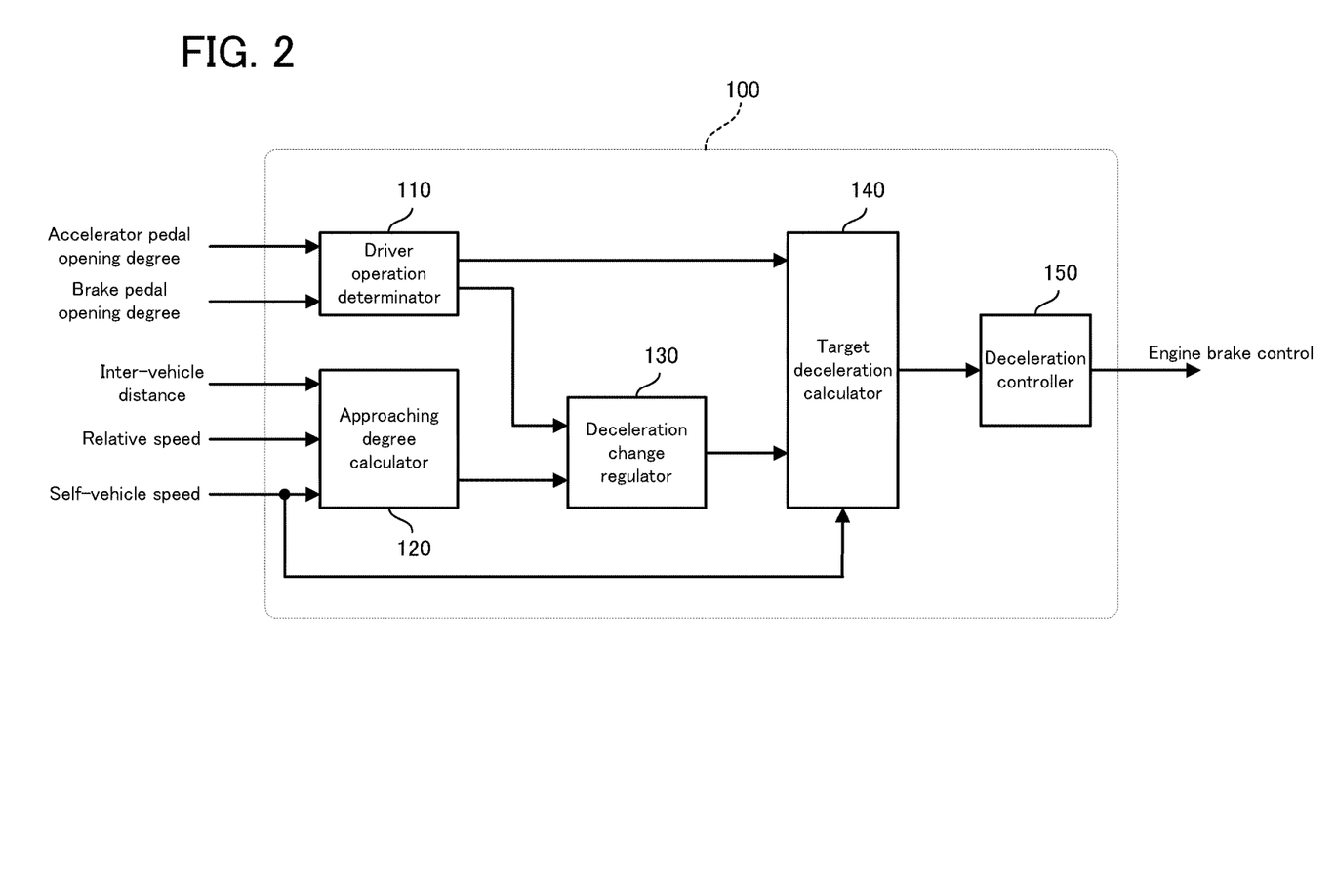
FIG. 2 is a block diagram illustrating a specific configuration of an ECU according to the embodiment.

The ECU 100 is a controller configured to control the operation of each part of the vehicle 1. Moreover, in particular, the ECU 100 according to the embodiment constitutes a main part of the vehicle running control apparatus. Hereinafter, a specific configuration of the ECU 100 will be explained with reference to FIG. 2. FIG. 2 is a block diagram illustrating the specific configuration of the ECU according to the embodiment.

In FIG. 2, the ECU 100 is provided with a driver operation determinator 110, an approaching degree calculator 120, a deceleration change regulator 130, a target deceleration calculator 140, and a deceleration controller 150. The aforementioned parts may be configured as hardware provided for the ECU 100, or as processing blocks realized by the ECU 100 with software.

The driver operation determinator 110 is configured to determine a state of operation by the driver, on the basis of the opening degree of the accelerator pedal inputted from the accelerator pedal sensor 40 and the opening degree of the brake pedal inputted from the brake pedal sensor 50. Specifically, the driver operation determinator 110 is configured to determine ON/OFF of the accelerator pedal and the brake pedal. Moreover, the driver operation determinator 110 is configured to determine the timing of OFF of the accelerator pedal and the brake pedal. A determination result by the driver operation determinator 110 is outputted to the deceleration change regulator 130 and the target deceleration calculator 140.

The approaching degree calculator 120 is configured to calculate an approaching degree, which is the degree of approach to the preceding vehicle, on the basis of the inter-vehicle distance to the preceding vehicle inputted from the inter-vehicle distance sensor 10, the relative speed to the preceding vehicle inputted from the relative speed sensor 20, and the speed of the self-vehicle 1 inputted from the self-vehicle speed sensor 30. The "approaching degree" is a parameter indicating to what extent the self-vehicle and the preceding vehicle approach to each other, and may be calculated to have a higher value as the inter-vehicle distance to the preceding vehicle becomes less, or as the relative speed to the preceding vehicle or the speed of the self-vehicle 1 becomes higher. The approaching degree may be calculated by not necessarily using both of, but using only one of the relative speed to the preceding vehicle and the speed of the self-vehicle 1. In other words, the approaching degree may be calculated from the inter-vehicle distance and the relative speed, or from the inter-vehicle distance and the self-vehicle speed. The approaching degree calculated on the approaching degree calculator 120 is outputted to the deceleration change regulator 130.

The deceleration change regulator 130 is configured to regulate, restrict or limit a change in deceleration to be less than or equal to a predetermined number of times, on the basis of the operating state of the accelerator pedal and the brake pedal inputted from the driver operation determinator 110, and on the basis of the approaching degree inputted from the approaching degree calculator 120. The "predetermined number of times" herein is an arbitrary value set to suppress the hunting in the deceleration of the self-vehicle. Specifically, as the predetermined number of times is set to have a less number, the change in the deceleration is further regulated or restricted. It is thus possible to effectively suppress the hunting in the deceleration. On the other hand, if the predetermined number of times is set to have a relatively large number, it is possible to perform flexible deceleration depending on circumstances, while suppressing the hunting in the deceleration. A specific process performed on the deceleration change regulator 130 will be detailed later. A processing result of the deceleration change regulator 130 is outputted to the target deceleration calculator 140, with the approaching degree.

The target deceleration calculator 140 is configured to calculate target deceleration, which is deceleration to be realized on the vehicle 1, on the basis of the approaching degree inputted from the deceleration change regulator 130. At this time, the target deceleration calculator 140 may calculate the target deceleration by using the self-vehicle speed inputted from the self-vehicle sensor 30, in addition to the approaching degree. The target deceleration is calculated as a value corresponding to an engine brake amount (i.e. a target value of the deceleration realized by the engine brake). Moreover, the target deceleration calculator 140 is configured to determine whether or not the target deceleration needs to be calculated, in accordance with the determination result of the driver operation determinator 110 and the determination result of the deceleration change regulator 130. Thus, depending on the determination results of the driver operation determinator 110 and the deceleration change regulator 130, the target deceleration calculator 140 may not calculate the target deceleration. The target deceleration calculated on the target deceleration calculator 140 is outputted to the deceleration controller 150.

The deceleration controller 150 is configured to control the engine brake amount of the vehicle 1 to realize the target deceleration inputted from the target deceleration calculator 140.

The approaching degree calculator 120, the deceleration change regulator 130, the target deceleration calculator 140, and the deceleration controller 150 are respectively one specific example of the "first calculator", the "regulator", the "second calculator", and the "controller".

Back in FIG. 1, the engine 200 is a main power source of the vehicle 1, and is configured, for example, as a gasoline engine and a diesel engine. The engine 200 is coupled with the drive shaft via the transmission 300, which is configured, for example, as a planetary gear mechanism. Thus, the deceleration controller 150 is configured to change the deceleration based on the engine brake on the vehicle 1, by controlling the transmission 300. If the vehicle 1 is provided with an alternator or a motor generator, the engine brake amount can be changed by controlling the alternator or the motor generator.

(Deceleration Control)

Figure 3:
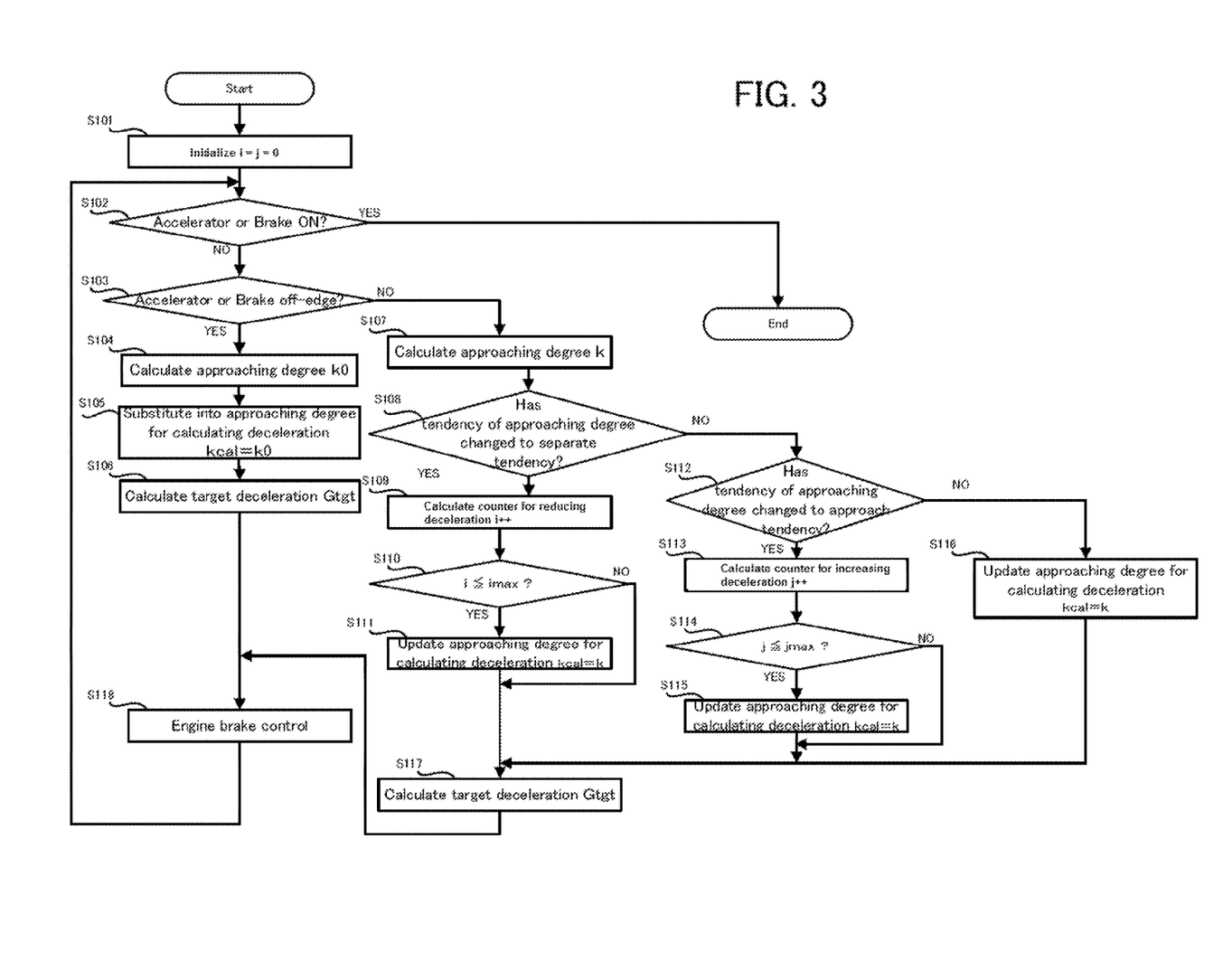
FIG. 3 is a flowchart illustrating a flow of operation of a vehicle running control apparatus according to the embodiment.

Next, the deceleration control performed by the vehicle running control apparatus according to the embodiment (i.e. the control of deceleration the self-vehicle 1 by using the engine brake) will be explained with reference to FIG. 3. FIG. 3 is a flowchart illustrating a flow of the operation of the vehicle running control apparatus according to the embodiment.

In FIG. 3, if the deceleration control is started, firstly, counter values i and j are initialized to be i=j=0, wherein the counter values are parameters for counting the number of changes in the deceleration to be realized on the vehicle 1 (step S101). The counter value i is a value for counting the number of changes in the deceleration from an increase side to a reduction side (i.e. the number of changes from a state in which the deceleration is not reduced to a state in which the deceleration is reduced). The counter value j is a value for counting the number of changes in the deceleration from the reduction side to the increase side (i.e. the number of changes from a state in which the deceleration is not increased to a state in which the deceleration is increased).

Then, on the driver operation determinator 110, it is determined whether or not the accelerator pedal or the brake pedal is ON (i.e. whether or not the accelerator pedal or the brake pedal is operated by the driver) (step S102). If it is determined that the accelerator pedal or the brake pedal is ON (the step S102: YES), a series of operations is ended without performing the subsequent process. In other words, the subsequent process is performed if both of the accelerator pedal and the brake pedal are OFF.

If it is determined that both of the accelerator pedal and the brake pedal are OFF (the step S102: NO), it is further determined on the driver operation determinator 110 whether or not a signal indicating ON/OFF of the accelerator pedal or the brake pedal is off-edge (i.e. whether or not it is immediately after the operation is stopped) (step S103).

If it is determined that the signal indicating the ON/OFF of the accelerator pedal or the brake pedal is off-edge (the step S103: YES), an approaching degree k0 is calculated on the approaching degree calculator 120 (step S104). The approaching degree k0 is a value calculated as an initial value of an approaching degree k, and is calculated only immediately after the operation of the accelerator pedal or the brake pedal is stopped.

The approaching degree k may be calculated by the following equation (1).

$$k = (Vr \pm \alpha V)/D \tag{1},$$

wherein D is the inter-vehicle distance, Vr is the relative speed, V is the self-vehicle speed, and $\alpha$ is a factor for weighting the self-vehicle speed V. As $\alpha$ increases, the weighting of the self-vehicle speed V on the relative speed Vr increases.

As is clear from the equation (1), the approaching degree k is a parameter calculated as a higher value as the inter-vehicle distance becomes less, or as the relative speed Vr and the self-vehicle speed V becomes higher. The approaching degree k may not necessarily be a value that takes into account both of the relative speed Vr and the self-vehicle speed V, as described above, and may be a value that takes into account only one of the relative speed Vr and the self-vehicle speed V.

The approaching degree k0 calculated in the step S104 is outputted to the deceleration change regulator 130. Then, on the deceleration change regulator 130, the approaching degree k0 is substituted into an approaching degree kcal for calculating the deceleration (step S105). The deceleration change regulator 130 is configured to regulate or restrict the change in the deceleration by updating the approaching degree kcal for calculating the deceleration only if a predetermined condition is satisfied, as described later. The approaching degree k0 calculated as the initial value is substituted into the approaching degree kcal for calculating the deceleration, without change.

The approaching degree kcal for calculating the deceleration is outputted to the target deceleration calculator 140. On the target deceleration calculator 140, target deceleration Gtgt is calculated from the approaching degree kcal for calculating the deceleration (step S106). The target deceleration Gtgt is deceleration based on the engine brake, which is to be realized in the deceleration control.

The calculated target deceleration Gtgt is outputted to the deceleration controller 150 configured to control the engine brake. On the deceleration controller 150, the engine brake amount of the vehicle 1 is controlled to be a value corresponding to the target deceleration Gtgt (step S118). After that, the process after the step S102 is repeated.

On the other hand, if it is determined that the signal indicating the ON/OFF of the accelerator pedal or the brake pedal is not off-edge (the step S103: NO), an approaching degree k is calculated on the approaching degree calculator 120 (step S107). The calculated approaching degree k is outputted to the deceleration change regulator 130. On the deceleration change regulator 130, the newly calculated approaching degree k and the previously calculated approaching degree k (i.e. one or a plurality of approaching degrees k calculated in the previous processing loops) are compared, and it is determined whether or not a tendency of the approaching degree k has changed from an approach tendency to a separate tendency (step S108).

If it is determined that the tendency of the approaching degree k has changed from the approach tendency to the separate tendency (the step S108: YES), the counter value i for counting the number of changes in the deceleration from the increase side to the reduction side on the vehicle 1 is incremented on the deceleration change regulator 130 (step S109). More specifically, the expression "if it is determined that the tendency of the approaching degree k has changed from the approach tendency to the separate tendency" means a state in which the inter-vehicle distance to the preceding vehicle, which has a reduction tendency so far, has started to increase. In this case, in the deceleration control based on the preceding vehicle, it is required to change the deceleration from the increase side to the reduction side (i.e. to reduce or mitigate the deceleration). Thus, here, the counter value i for counting the number of changes in the deceleration from the increase side to the reduction side on the vehicle 1 is incremented.

Then, on the deceleration change regulator 130, it is further determined whether or not the counter value i after the increment is less than or equal to an allowable number imax of changes on the deceleration reduction side (step S110). The allowable number imax of changes on the deceleration reduction side is one specific example of the "first predetermined number of times", and is set as an appropriate value to suppress the hunting in the deceleration described later.

If it is determined that the counter value i is less than or equal to the allowable number imax of changes on the deceleration reduction side (the step S110: YES), the approaching degree kcal for calculating the deceleration is updated to the newly calculated approaching degree k (step S111). On the other hand, if it is determined that the counter value i is not less than or equal to the allowable number imax of changes on the deceleration reduction side (the step S110: NO), the update of the approaching degree kcal for calculating the deceleration is omitted (in other words, the value of the approaching degree kcal for calculating the deceleration used so far is held).

On the other hand, if it is determined that the tendency of the approaching degree k has not changed from the approach tendency to the separate tendency (the step S108: NO), it is further determined on the deceleration change regulator 130 whether or not the tendency of the approaching degree k has changed from the separate tendency to the approach tendency (step S112).

If it is determined that the tendency of the approaching degree k has changed from the separate tendency to the approach tendency (the step S112: YES), the counter value j for counting the number of changes in the deceleration from the reduction side to the increase side is incremented on the deceleration change regulator 130 (step S113). More specifically, the expression "if it is determined that the tendency of the approaching degree k has changed from the separate tendency to the approach tendency" means a state in which the inter-vehicle distance to the preceding vehicle, which has an increase tendency so far, has started to decrease. In this case, in the deceleration control based on the preceding vehicle, it is required to change the deceleration from the reduction side to the increase side (i.e. to increase or enhance the deceleration). Thus, here, the counter value j for counting the number of changes in the deceleration from the reduction side to the increase side on the vehicle 1 is incremented.

Then, on the deceleration change regulator 130, it is further determined whether or not the counter value j after the increment is less than or equal to an allowable number jmax of changes on the deceleration increase side (step S114). The allowable number jmax of changes on the deceleration increase side is one specific example of the "second predetermined number of times", and is set as an appropriate value to suppress the hunting in the deceleration described later.

If it is determined that the counter value j is less than or equal to the allowable number jmax of changes on the deceleration increase side (the step S114: YES), the approaching degree kcal for calculating the deceleration is updated to the newly calculated approaching degree k (step S115). On the other hand, if it is determined that the counter value j is not less than or equal to the allowable number jmax of changes on the deceleration increase side (the step S114: NO), the update of the approaching degree kcal for calculating the deceleration is omitted (in other words, the value of the approaching degree kcal for calculating the deceleration used so far is held).

On the other hand, if it is determined that the tendency of the approaching degree k has not changed from the separate tendency to the approach tendency (the step S112: NO), it is considered that there is little change in the approaching degree k. In this case, on the deceleration change regulator 130, the approaching degree kcal for calculating the deceleration is updated to the newly calculated approaching degree k (step S116).

The approaching degree kcal for calculating the deceleration determined after the aforementioned series of determination process operations (i.e. the process from the step S107 to the step S116) is outputted to the target deceleration calculator 140. Then, on the target deceleration calculator 140, the target deceleration Gtgt is calculated on the basis of the approaching degree kcal for calculating the deceleration (step S117). The calculated target deceleration Gtgt is outputted to the deceleration controller 150. Then, on the deceleration controller 150, the engine brake amount of the vehicle 1 is controlled to be a value corresponding to the target deceleration Gtgt (the step S118). After that, the process after the step S102 is repeated.

As explained above, in the deceleration control according to the embodiment, the process of calculating the target deceleration Gtgt and controlling the engine brake is repeatedly performed from the timing of OFF to the timing of ON of the accelerator pedal and the brake pedal. As a result, while the accelerator pedal and the brake pedal are OFF, the engine brake is automatically adjusted to have an appropriate value, by which the deceleration of the self-vehicle 1 can be realized.

(Method of Controlling Engine Brake)

Figure 4:
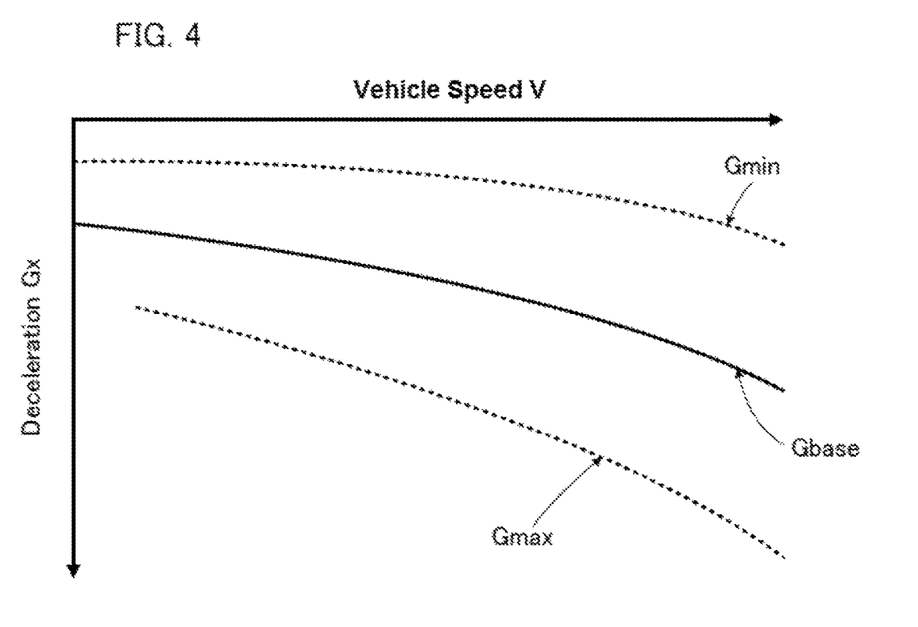
FIG. 4 is a graph illustrating a control area of engine brake deceleration Gx.

Hereinafter, a method of controlling the deceleration by the engine brake (hereinafter referred to as "engine brake deceleration Gx" as occasion demands) in the deceleration control described above will be explained in detail with reference to FIG. 4. FIG. 4 is a graph illustrating a control area of the engine brake deceleration Gx.

As illustrated in FIG. 4, the engine brake deceleration Gx can be controlled in an area or range of maximum deceleration Gmax to minimum deceleration Gmin. The maximum deceleration Gmax and the minimum deceleration Gmin are values set to avoid a detrimental effect caused by the deceleration, and may change in accordance with the vehicle speed V. Specifically, the maximum deceleration Gmax and the minimum deceleration Gmin are mildly increased as the vehicle speed V increases, as illustrated in FIG. 4.

Reference deceleration Gbase, which is a reference value of the engine brake deceleration Gx, is set as a substantially middle value between the maximum deceleration Gmax and the minimum deceleration Gmin. Thus, the reference deceleration Gbase also changes in accordance with the vehicle speed V, as illustrated in FIG. 4. The reference deceleration Gbase may be also set as a constant value that does not depend on the vehicle speed V.

The reference deceleration Gbase is a value of the engine brake deceleration Gx when the deceleration control according to the embodiment is not performed. Thus, in the deceleration control according to the embodiment, the engine brake Gx, which is the reference deceleration Gbase so far, is controlled to be the target deceleration Gtgt.

Figure 5:
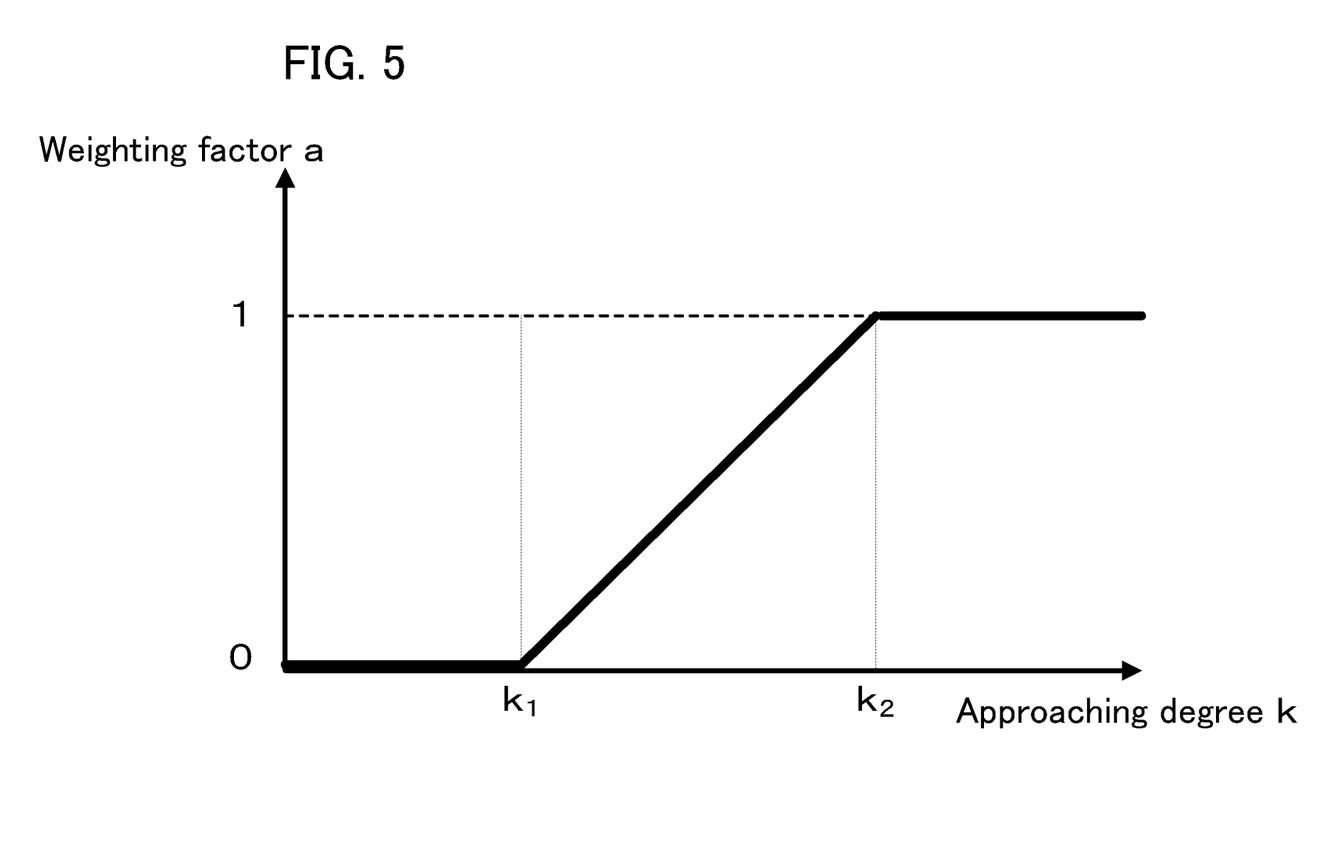
FIG. 5 is a graph illustrating a relation between a weighting factor a and an approaching degree k.

The target deceleration Gtgt can be calculated by using the following equation (2).

$$Gtgt = a \times Gmax + (1-a) \times Gmin \qquad (2),$$

wherein a is a weighting factor and is a value that varies between 0 and 1 in accordance with the approaching degree k. Hereinafter, the variation of the weighting factor a will be explained in detail with reference to FIG. 5. FIG. 5 is a graph illustrating a relation between the weighting factor a and the approaching degree k. As illustrated in FIG. 5, if the approaching degree k is a value between 0 and $k_1$ (i.e. if the self-vehicle 1 is relatively far from the preceding vehicle), the weighting factor a is 0. If the weighting factor a is 0, the target deceleration Gtgt=the minimum deceleration Gmin. As described above, if the approaching degree k is low, it is considered that there is no problem even if the inter-vehicle distance to the preceding vehicle is reduced. Therefore, the deceleration of the vehicle 1 is minimized.

If the approaching degree k is a value between $k_1$ and $k_2$ (i.e. if the self-vehicle 1 and the preceding vehicle approach to each other to some extent), the weighting factor a increases as the approaching degree k increases. As described above, if the weighting factor a varies, the target deceleration Gtgt approaches to the minimum deceleration Gmin as the approaching degree k decreases, and approaches to the maximum deceleration Gmax as the approaching degree k increases. Therefore, as the approaching degree k increases, the vehicle 1 is decelerated more greatly.

If the approaching degree k is greater than $k_2$ (i.e. if the self-vehicle 1 and the preceding vehicle extremely approach to each other), the weighting factor a is 1. If the weighting factor a is 1, the target deceleration Gtgt=the maximum deceleration Gmax. As described above, if the approaching degree k is high, the vehicle 1 is greatly decelerated in order to keep the inter-vehicle distance to the preceding vehicle.

By using the target deceleration Gtgt calculated in the above manner, it is possible to perform the deceleration while keeping the approaching degree k at an appropriate value. The threshold values $k_1$ and $k_2$ for determining the variation of the weighting factor a may be set on the basis of a range of the approaching degree k desired to be kept.

(Effects by Regulating or Restricting the Number of Changes in Deceleration)

Figure 6:
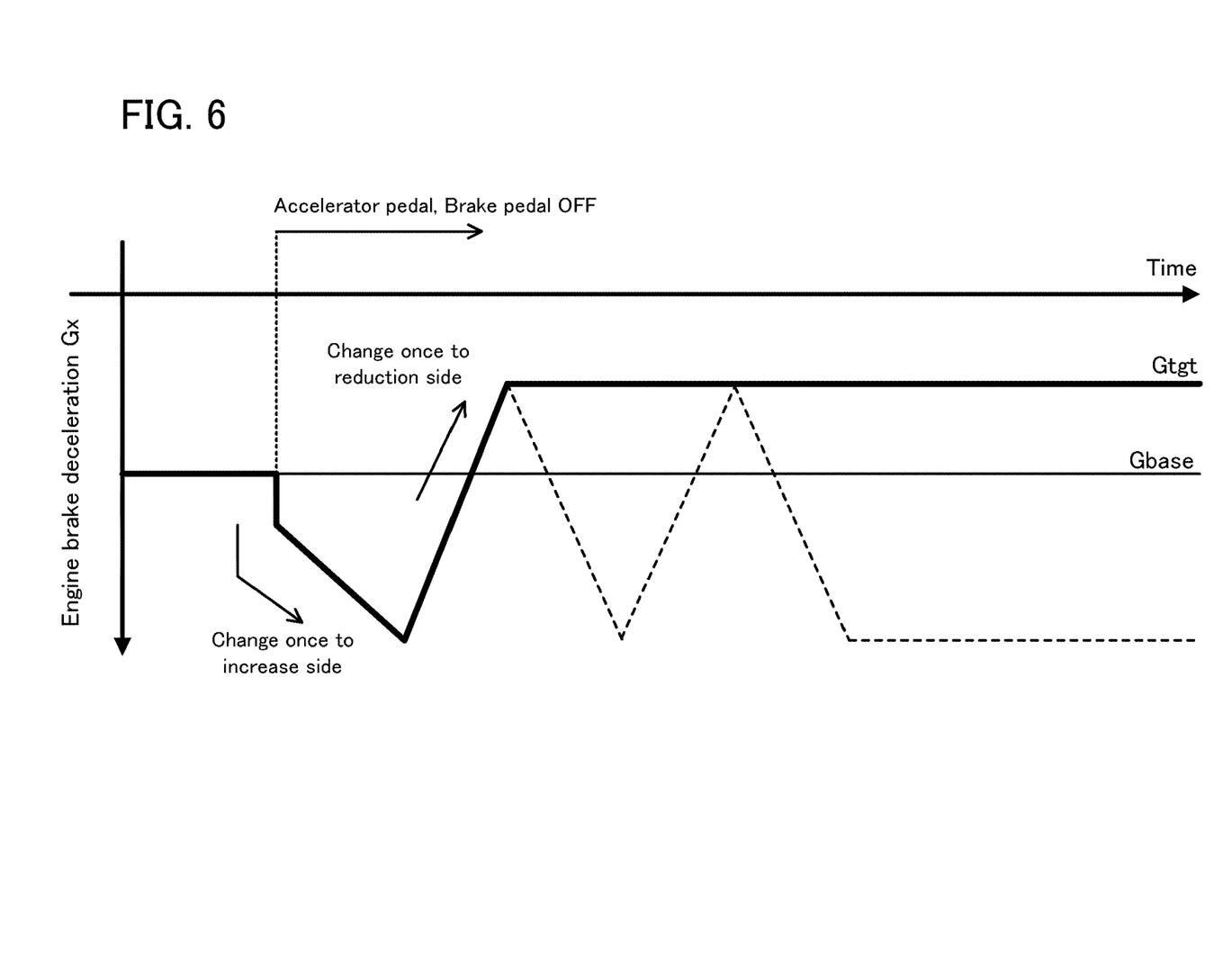
FIG. 6 is version 1 of a time chart illustrating a change in the engine brake deceleration Gx in deceleration control.
Figure 7:
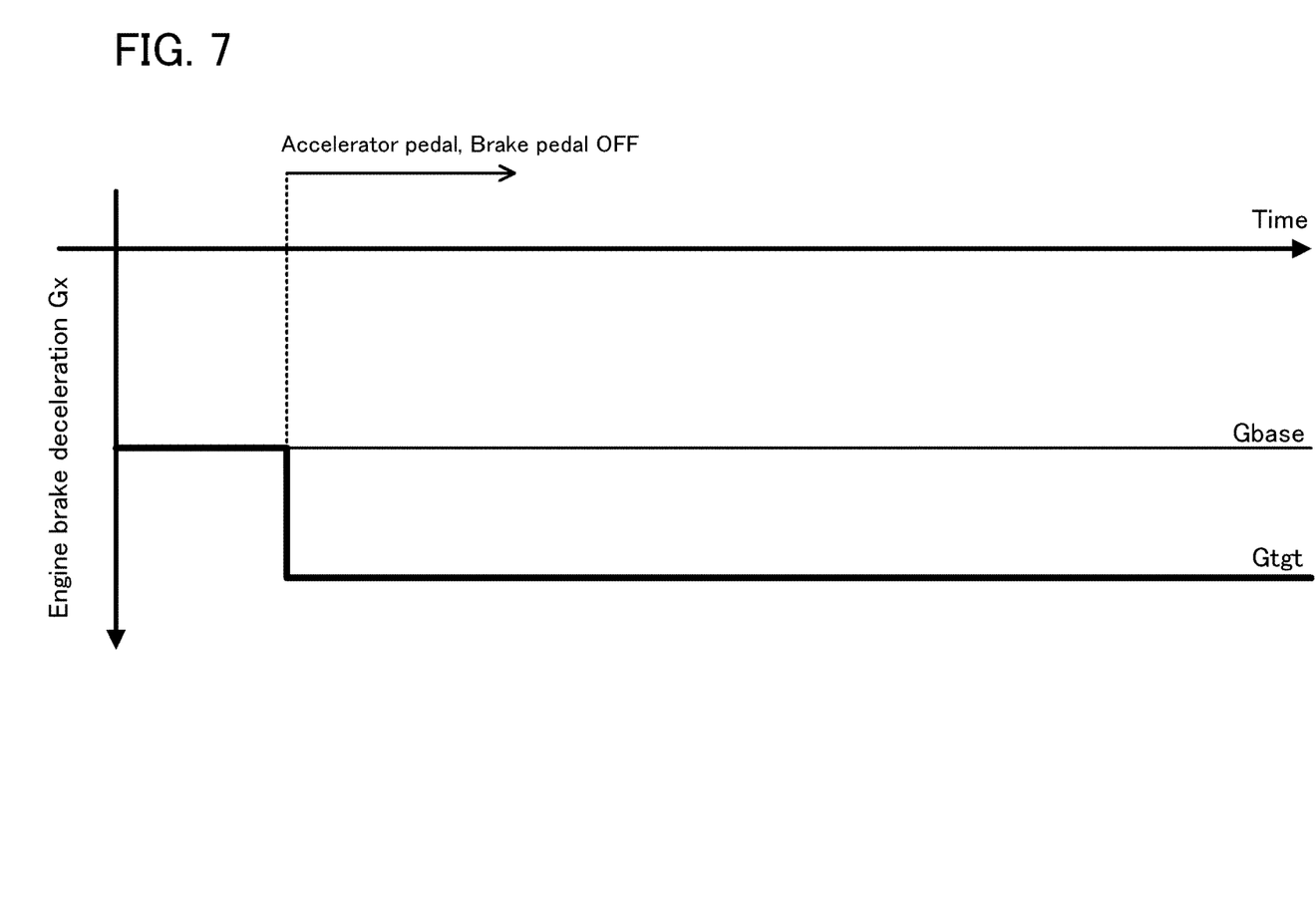
FIG. 7 is version 2 of the time chart illustrating the change in the engine brake deceleration Gx in the deceleration control.
Figure 8:
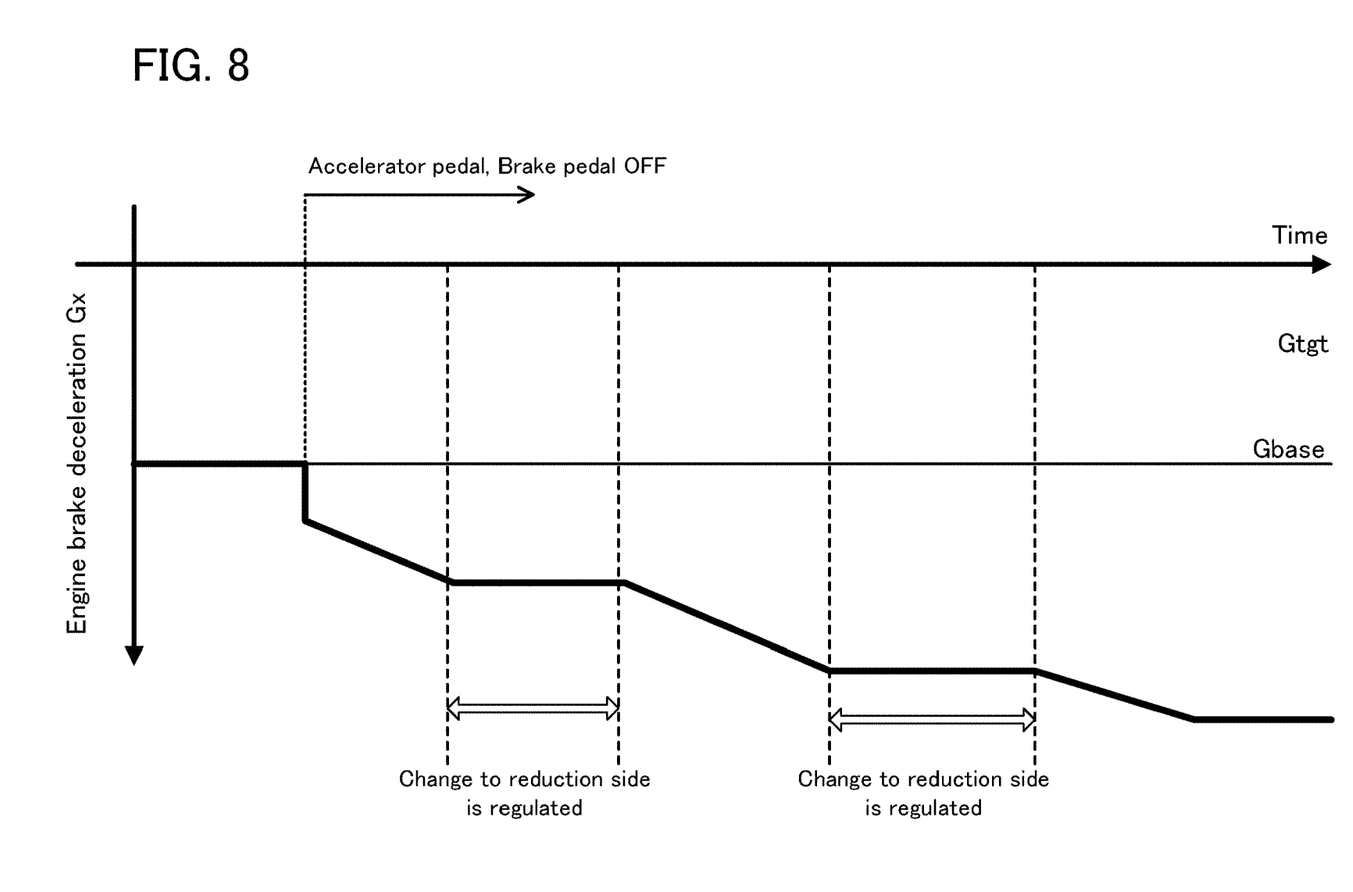
FIG. 8 is version 3 of the time chart illustrating the change in the engine brake deceleration Gx in the deceleration control.
Figure 9:
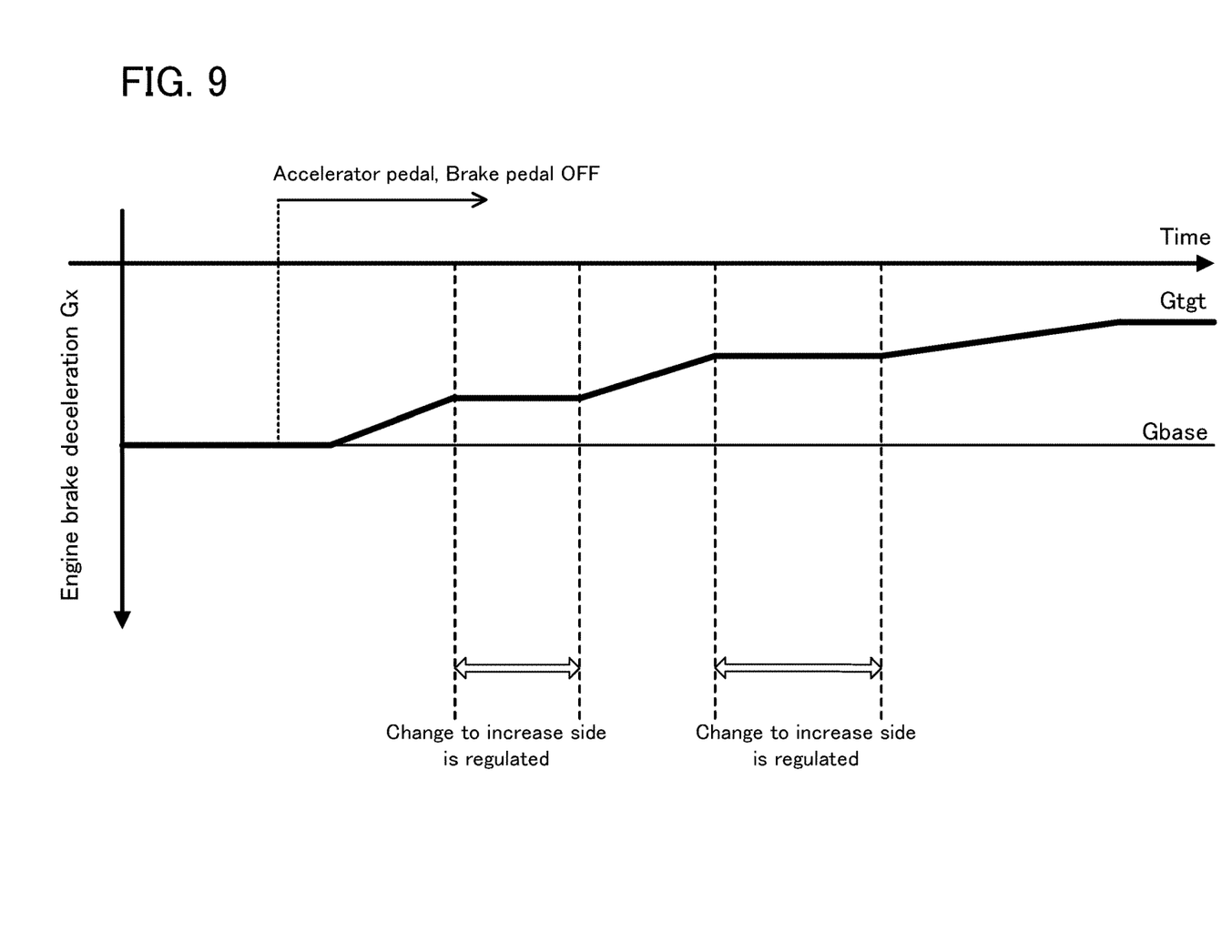
FIG. 9 is version 4 of the time chart illustrating the change in the engine brake deceleration Gx in the deceleration control.

Next, effects achieved by regulating or restricting the number of changes in the deceleration in the deceleration control described above will be specifically explained with reference to FIG. 6 to FIG. 9. FIG. 6 is version 1 of a time chart illustrating a change in the engine brake deceleration Gx in the deceleration control. FIG. 7 is version 2 of the time chart illustrating the change in the engine brake deceleration Gx in the deceleration control. FIG. 8 is version 3 of the time chart illustrating the change in the engine brake deceleration Gx in the deceleration control. FIG. 9 is version 4 of the time chart illustrating the change in the engine brake deceleration Gx in the deceleration control.

According to the deceleration control in the embodiment, if the counter value i is greater than the allowable number imax of changes on the deceleration reduction side, and if the counter value j is greater than the allowable number jmax of changes on the deceleration increase side, the approaching degree kcal for calculating the deceleration is not updated. If the approaching degree kcal for calculating the deceleration is not updated, the target deceleration Gtgt does not change. Thus, if the counter value i is greater than the allowable number imax of changes on the deceleration reduction side, the subsequent change on the reduction side of the target deceleration Gtgt is regulated or restricted. In the same manner, if the counter value j is greater than the allowable number jmax of changes on the deceleration increase side, the subsequent change on the increase side of the target deceleration Gtgt is regulated or restricted. As described above, in the embodiment, the number of changes in the deceleration can be regulated or restricted to an arbitrary number of times.

FIG. 6 illustrates a control example in which each of the allowable number imax of changes on the deceleration reduction side and the allowable number jmax of changes on the deceleration increase side is set to one. In this example, the target deceleration Gtgt changes to the increase side immediately after the accelerator pedal and the brake pedal are OFF. Specifically, the target deceleration Gtgt changes vertically downward in FIG. 6 in the timing of OFF of the accelerator pedal and the brake pedal. After that, the target deceleration Gtgt further changes to the increase side. Specifically, the target deceleration Gtgt changes diagonally toward the lower right of FIG. 6. After that, the target deceleration Gtgt further changes to the reduction side. Specifically, the target deceleration Gtgt changes diagonally toward the upper right of FIG. 6.

In the embodiment, if the target deceleration Gtgt changes a plurality of times in the same direction, the number of changes is counted as one. In other words, the counter value is incremented if the tendency of the approaching degree k has changed from the approach tendency to the separate tendency or if the tendency has changed from the separate tendency to the approach tendency, for which the explanation is given to the processes in the steps S108 and S109 and the process in the steps S112 and S113 in the flowchart in FIG. 3. Thus, even if the target deceleration Gtgt changes, if it is a change in the same direction as before, then, the change is not counted as a new change. If the target deceleration Gtgt changes in an opposite direction, the number of changes is newly counted as one. Thus, in the example illustrated in FIG. 6, the number of changes to the increase side is counted as one, and then, the number of changes to the reduction side is counted as one.

According to the deceleration control in the embodiment, at a time point at which the number of changes to the increase side is counted as one and the number of changes to the reduction side is counted as one, the update of the approaching degree kcal for calculating the deceleration is regulated or restricted. As a result, the target deceleration Gtgt after the change from the increase side to the reduction side has a constant value as illustrated in FIG. 6. On the other hand, if the update of the approaching degree kcal for calculating the deceleration is not regulated or restricted, the target deceleration Gtgt varies frequently, as illustrated in a dashed line in FIG. 6, which is caused by the variation of the inter-vehicle distance to the preceding vehicle. The hunting in the deceleration may become cause to give discomfort to the driver. In contrast, according to the embodiment in which the change in the deceleration is regulated or restricted, it is possible to effectively suppress the hunting in the deceleration and to reduce the driver's discomfort.

FIG. 7 illustrates a control example in which each of the allowable number imax of changes on the deceleration reduction side and the allowable number jmax of changes on the deceleration increase side is set to zero. In this example, the target deceleration Gtgt changes to the increase side, on the basis of the approaching degree k0, which is calculated immediately after the accelerator pedal and the brake pedal are OFF, but all the subsequent changes in the target deceleration Gtgt are regulated or restricted. Thus, the target deceleration Gtgt changes only once at the beginning, and has a constant value after that. As described above, if the number of changes in the target deceleration Gtgt is set to be extremely small, the hunting can be suppressed more effectively. On the other hand, as in the example in FIG. 6, the number of changes is allowed to some extent, more flexible deceleration can be realized in accordance with the approaching degree k.

FIG. 8 illustrates a control example in which the allowable number imax of changes on the deceleration reduction side is set to zero and the allowable number jmax of changes on the deceleration increase side is set to three. In this example, the change to the reduction side of the target deceleration Gtgt is regulated or restricted from the beginning, but the change to the increase side is allowed a plurality of times. Thus, even after the change to the reduction side of the target deceleration Gtgt is regulated or restricted and the target deceleration Gtgt becomes constant, the target deceleration Gtgt can be further changed to the increase side. In this case, the target deceleration Gtgt changes intermittently, but the change direction is regulated or restricted only to the increase side. It is thus possible to reduce the driver's discomfort caused by the variation of the deceleration.

FIG. 9 illustrates a control example in which the allowable number imax of changes on the deceleration reduction side is set to three and the allowable number jmax of changes on the deceleration increase side is set to zero. In this example, the change to the increase side of the target deceleration Gtgt is regulated or restricted from the beginning, but the change to the reduction side is allowed a plurality of times. Thus, even after the change to the increase side of the target deceleration Gtgt is regulated or restricted and the target deceleration Gtgt becomes constant, the target deceleration Gtgt can be further changed to the reduction side. In this case, the target deceleration Gtgt changes intermittently, but the change direction is regulated or restricted only to the reduction side. It is thus possible to reduce the driver's discomfort caused by the variation of the deceleration.

As explained above, according to the vehicle running control apparatus in the embodiment, the vehicle 1 can be decelerated by regulating or restricting the number of changes in the deceleration in the deceleration control.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A vehicle running control apparatus configured to control acceleration and deceleration of a self-vehicle in accordance with an approaching degree between the self-vehicle and a preceding vehicle, said vehicle running control apparatus comprising:
a first detector configured to detect (i) an inter-vehicle distance between the self-vehicle and the preceding vehicle and (ii) a speed of the self-vehicle, or a relative speed between the self-vehicle and the preceding vehicle;
a second detector configured to detect accelerator-off and brake-off in the self-vehicle;
a first calculator configured to calculate the approaching degree on the basis of the inter-vehicle distance and on the basis of the speed of the self-vehicle or the relative speed;
a second calculator configured to calculate target deceleration corresponding to an engine brake amount on the basis of the approaching degree calculated on the first calculator, when the accelerator-off and the brake-off are detected;
a controller configured to change the engine brake amount in accordance with the target deceleration; and
a regulator configured to hold the target deceleration constant and decrease the speed of the self-vehicle, when a number of changes from an increase side to a reduction side of the engine brake amount by said controller, and a number of changes from the reduction side to the increase side exceeds a predetermined number of times, after the accelerator-off and the brake-off are detected.

2. The vehicle running control apparatus according to claim 1, wherein the predetermined number of times is individually set as a first predetermined number of times corresponding to the changes from the increase side to the reduction side of the engine brake amount by said controller, and as a second predetermined number of times corresponding to the changes from the reduction side to the increase side.

3. The vehicle running control apparatus according to claim 2, wherein said first calculator is configured to calculate the approaching degree, when the accelerator-off or the brake-off is detected.

4. The vehicle running control apparatus according to claim 1, wherein said first calculator is configured to calculate the approaching degree, when the accelerator-off or the brake-off is detected.

* * * * *